United States Patent Office 3,592,871
Patented July 13, 1971

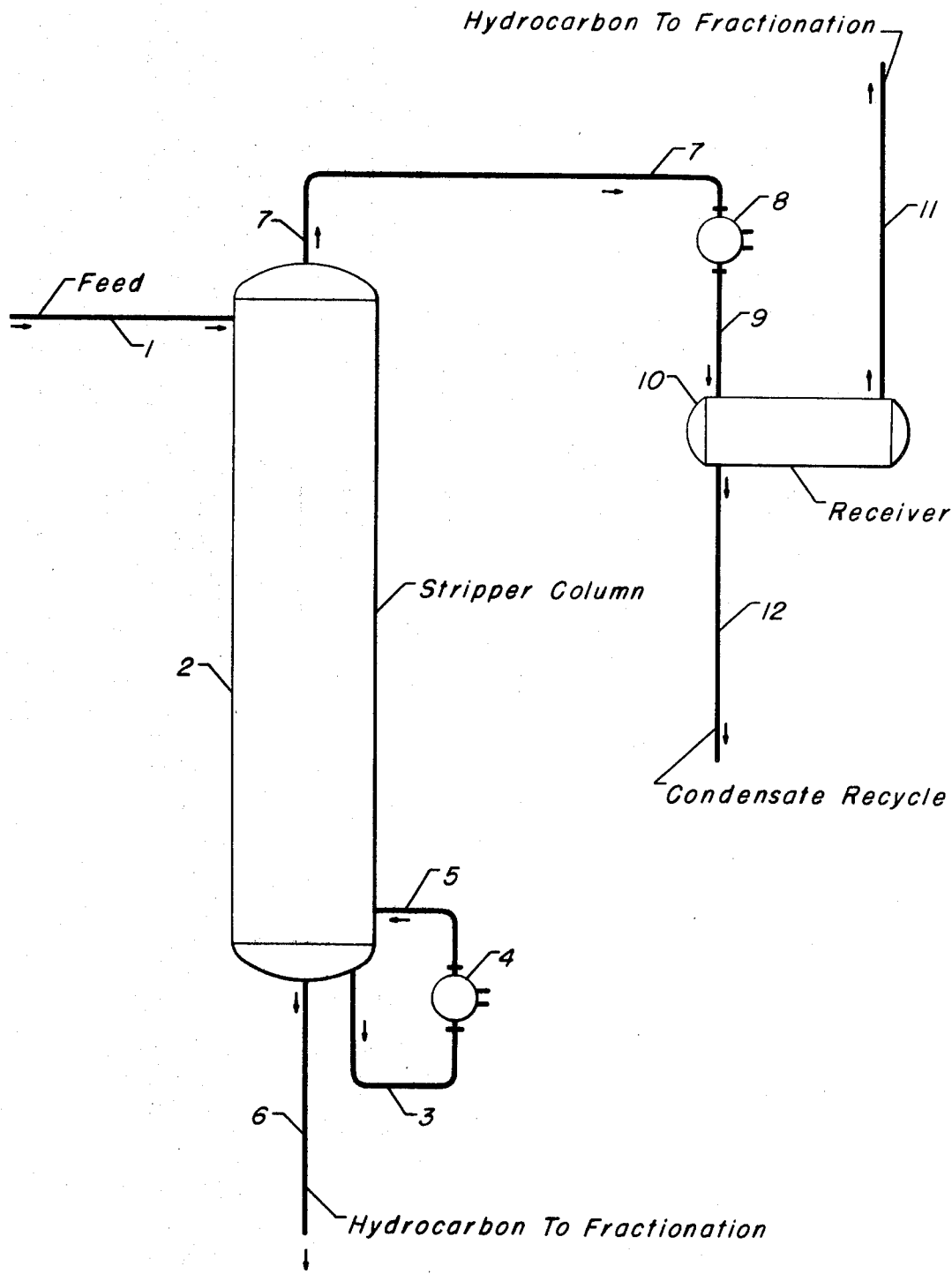

3,592,871
PROCESS FOR SEPARATING AN ALKYLATE-
CONTAINING HYDROCARBON MIXTURE
UTILIZING A STRIPPING AND PARTIAL
CONDENSATION SYSTEM
Edwin K. Jones, Kenilworth, Ill., assignor to Universal
Oil Products Company, Des Plaines, Ill.
Filed Mar. 12, 1969, Ser. No. 806,395
Int. Cl. C07c 3/54
U.S. Cl. 260—683.43                           4 Claims

ABSTRACT OF THE DISCLOSURE

A process is provided for separating a hydrocarbon feed mixture comprising $C_3$ hydrocarbons, $C_4$ hydrocarbons and alkylate utilizing a stripping and partial condensation system.

BACKGROUND OF THE INVENTION

This invention relates to a separation process. It particularly relates to a process for separating a hydrocarbon feed mixture comprising $C_3$ hydrocarbons, $C_4$ hydrocarbons and alkylate utilizing a stripping and partial condensation system. This invention specifically relates to a process for separating a hydrocarbon feed mixture comprising $C_3$ hydrocarbons, $C_4$ hydrocarbons and alkylate produced by the alkylation of an isoparaffin hydrocarbon feedstock with an olefinic hydrocarbon feedstock utilizing an alkylation catalyst.

It is well known in the prior art that catalytic alkylation utilizing sulfuric acid or hydrofluoric acid as the catalyst is an important chemical tool for preparing alkylated hydrocarbons and derivatives thereof. The commercial and industrial demand for these products is exemplified by the demand for isoparaffin hydrocarbons and alkyl-substituted benzenes of the gasoline boiling range and with the demand for alkyl substituted aromatics suitable for conversion for surfactants, e.g., detergents, wetting agents, and the like.

The catalytic alkylation process to which the present invention is especially applicable consists of a process in which a mixture of hydrocarbons containing isoparaffins such as isobutane, isopentane, and the like, and olefins such as propylene, butylenes, isobutenes, amylenes, and the like, are mixed intimately in the presence of a strong acid catalyst such as hydrofluoric acid or sulfuric acid at generally room temperature or lower for a time sufficient to complete the reaction. The effluent from the reaction zone contains isoparaffin hydrocarbons of higher molecular weight than the isoparaffins in the original mixture. Isobutane has been used almost exclusively because of its reactivity and availability to produce high quality alkylate products. Accordingly, for convenience, the term "alkylate" as used in the specification and claims is intended to embody the higher molecular weight reaction product from the alkylation reaction. In similar manner among the olefins, butenes have been used almost exclusively. Propylene and the pentenes, and even higher boiling olefinic hydrocarbons, can be used according to their availability.

However, as is typical in most commercial petroleum and petrochemical plants, the reaction between the isobutane and the olefin, such as butylene, requires the presence of a large excess quantity of isobutane such as, for example, 6:1 to 16:1 isobutane $C_4$ olefin molar feed ratio, in the reaction zone to significantly enhance the quality of the alkylate produced. Accordingly, there is a large excess of isoparaffin hydrocarbon remaining in the effluent from the alkylation reaction zone. Thus, it is desirable to recover and reuse the isoparaffin reactant in as high yield as possible and in as simple and economical manner as possible.

In like manner, propane which passes through the alkylation reaction unchanged and the small amount of propane that is produced from the reaction must also be removed from the desired alkylate product. The separation of the propane from isobutane is conveniently done in a depropanizing column since the deisobutanizer tower can only separate the isobutane from the normal butane in an economical manner. Thus, a depropanizer column is normally of considerable size so that propane can be recovered in substantially pure form and $C_4$ hydrocarbons may be rejected from the bottom of the tower suitable for reuse in the reaction or for other uses known to those skilled in the art. Therefore, it is desirable to separate the propane or $C_3$ hydrocarbons from the $C_4$ hydrocarbons in as an economical manner as possible.

Generally, prior art methods have taken the hydrocarbon portion of the reaction zone effluent into what is commonly called a deisobutanizer tower wherein an isobutane is recovered as an overhead fraction and the desired alkylate product is removed from the bottom of the tower. The difficulty with this practice is that the feed streams from normal refining operations to an alkylation plant contain not only the side reactant, isobutane and butylene, but also contains $C_2$ to $C_5$ hydrocarbons in various amounts. Therefore, the overhead stream from the deisobutanizer tower in a conventional alkylation plant not only contains isobutane, but also contains at least the $C_3$ hydrocarbons which were present in the feed. In order to make an economical separation of the $C_3$ and $C_4$ hydrocarbons, the deisobutanizer tower of necessity must be of considerable height and also must contain extensive condensing and receiving equipment for the overhead streams. Typically, the prior art deisobutanizer tower is operated such that the desired isobutane fraction is condensed and a vapor fraction containing the $C_3$ hydrocarbons is removed from the overhead receiver for further processing in a subsequent depropanizer tower.

SUMMARY OF THE INVENTION

Accordingly, it is an object of the present invention to provide a separation scheme.

It is another object of this invention to provide an improved process method for separating a hydrocarbon feed mixture comprising $C_3$ hydrocarbons, $C_4$ hydrocarbons, and alkylate.

It is a specific object of this invention to provide a separation scheme for separating a hydrocarbon feed mixture comprising $C_3$ hydrocarbons, $C_4$ hydrocarbons, and alkylate that will reduce the sizes of the depropanizer and deisobutanizer columns in a conventional fractionation train for an alkylation reaction process unit.

It is still aother object of this invention to provide a process for enriching the feed to the depropanizer column operating in conjunction with a debutanizer column.

Therefore, the present invention provides a process for separating a hydrocarbon feed mixture comprising $C_3$ hydrocarbons, $C_4$ hydrocarbons and alkylate which comprises the steps of: (a) introducing said feed mixture into an upper section of stripping means maintained under stripping conditions to strip said feed mixture into a gaseous fraction and a liquid fraction; (b) vaporizing in a lower section of said stripping means at least a portion of said liquid fraction of Step (a); (c) removing an overhead first gaseous fraction comprising $C_3$ and $C_4$ hydrocarbons; (d) partially condensing said overhead fraction under conditions sufficient to produce a second vapor fraction comprising $C_3$ hydrocarbons and a second liquid fraction comprising isobutane; and, (e) removing from said stripping means a bottoms first liquid fraction comprising isobutane, normal butane and alkylate.

As will be described hereinafter in greater detail, the essence of my invention encompasses separation of a hydrocarbon feed mixture comprising $C_3$ hydrocarbons, $C_4$ hydrocarbons and alkylate utilizing stripping means and a partial condensation system in combination so that the desired separation can be achieved with minimum size fractionation equipment.

The description of my invention will be limited to the processing scheme for handling the effluent from a conventional $C_4$ alkylation reaction zone although the scope of the invention is not necessarily limited thereto. The effluent is prepared by means well known to those skilled in the art and generally comprises the steps of commingling an olefinic-containing feedstock with an isoparaffin-containing feedstock and passing the mixture into a conventional alkylation reaction zone. An isobutane-enriched paraffinic hydrocarbon stream is also added to the reaction zone in order that the isoparaffin-to-olefin ratio in the presence of the catalyst is at the proper level. Means of removing the heat of reaction from the reactor must be provided and the contact time in the reactor maintained for a period sufficient to intimately mix and contact the feed mixture with the catalyst so that the alkylation reaction can occur. The total effluent from the alkylation reaction zone is removed and passed to separation means whereby the acid is separated from the hydrocarbon phase generally by settling. The acid is returned to the process in admixture with fresh acid catalyst, as needed, and the hydrocarbon phase is further processed in accordance with my invention. It is to be noted that I am concerned with the hydrocarbon phase or hydrocarbon feed mixture comprising $C_3$ hydrocarbons, $C_4$ hydrocarbons and alkylate which has already been separated from the total effluent from the catalytic alkylation reaction zone.

My invention can be most clearly described and illustrated with reference to the attached drawing which is a schematic representation of a specific embodiment of this invention.

DESCRIPTION OF THE DRAWING

Referring now to the drawing, a hydrocarbon feed mixture comprising $C_3$ hydrocarbons (as well as lighter $C_2$ hydrocarbons) $C_4$ hydrocarbons and alkylate pass via line 1, labeled feed, into an upper section of stripping means labeled stripper column 2 which is maintained under stripping conditions including an overhead temperature of about 140° F. to about 250° F., a bottoms temperature of from about 225° F. to about 400° F. and a pressure of from about 125 p.s.i.g. to about 350 p.s.i.g. to strip the feed mixture into a gaseous fraction and a liquid fraction. It is preferred that the overhead temperature be maintained at temperatures in the range of from about 180° F. to about 200° F. and the preferred bottoms temperature is in the range of from about 280° F. to about 300° F. The preferred operating pressure of stripper column 2 is a pressure in the range of from about 150 to about 250 p.s.i.g. It is also contemplated within the scope of this invention that preheating means (not shown) may be present in line 1 to preheat the hydrocarbon feed mixture passing to stripper column 2. The stripper column may contain trays, baffles, heating means, cooling means, and the like.

In the stripper column, the liquid fraction is vaporized in a lower section of the stripping column so that at least a portion of the liquid fraction is vaporized. It is preferred that from about 50% to about 90% by volume of the liquid fraction be vaporized in this lower section of stripper column 2. In the drawing, a portion of the liquid is passed via line 3 to heat exchanger 4, which furnishes the requisite amount of heat needed for vaporization of the liquid fraction, and back to stripper column 2 via line 5.

An overhead first gaseous fraction comprising $C_3$ and $C_4$ hydrocarbons is removed from an upper portion of stripper column 2 and passes via line 7 through partial condensing means 8 and then via line 9 into receiver 10. Partial condenser 8 partially condenses the overhead fraction under conditions sufficient to produce a second vapor fraction comprising $C_3$ hydrocarbons and a second liquid fraction comprising isobutane. In the drawing, the second vapor fraction is represented as being removed from receiver 10 via line 11. It is preferred that this gaseous fraction be passed into fractionation means (not shown) under conditions sufficient to produce a substantially pure $C_3$ product stream. The second liquid fraction passes from receiver 10 via line 12, called condensate recycle, and is preferably recycled into the alkylation reaction zone means (not shown).

A bottoms first liquid fraction comprising isobutane, normal butane, and alkylate is removed from stripping column 2 via line 6 and, in a preferred embodiment, passes into fractionation means (not shown) under conditions sufficient to produce a substantially pure alkylate product stream.

In a preferred embodiment, it is preferred that the second vapor fraction comprises from about 5 to about 50% by volume of the overhead fraction passing via line 7 through partial condensing means 8 and line 9 into receiver 10.

PREFERRED EMBODIMENT

In a particularly preferred embodiment of this invention, this invention provides a process for separating a hydrocarbon feed mixture comprising $C_3$ hydrocarbons, $C_4$ hydrocarbons, and alkylate comprising the steps of: (a) introducing said feed mixture into an upper section of stripping means maintained under stripping conditions including an overhead temperature of from about 140° F. to about 250° F., a bottoms temperature of from about 225° F. to about 400° F. and a pressure of from about 125 p.s.i.g. to about 350 p.s.i.g. to strip said feed mixture into a gaseous fraction and a liquid fraction; (b) vaporizing in a lower section of said stripping means from about 50% to about 90% by volume of said liquid fraction of Step (a); (c) removing an overhead first gaseous fraction comprising $C_3$ and $C_4$ hydrocarbons; (d) partially condensing said overhead fraction under conditions sufficient to produce a second vapor fraction comprising $C_3$ hydrocarbons and a second liquid fraction comprising isobutane; and, (e) removing from said stripping means a bottoms first liquid fraction comprising isobutane, normal butane and alkylate.

Thus, it is apparent that the present invention provides a process for separating a hydrocarbon feed mixture comprising $C_3$ hydrocarbons, $C_4$ hydrocarbons, and alkylate utilizing a series of processing steps to accomplish the separation in a more facile and economical manner. Further, the utilization of my invention in a commercial flow scheme results in the reduction of the size of the fractionation train that would normally follow a conventional alkylation reaction process unit. This reduction in size represents a considerable economy of operation over the prior art processing scheme.

I claim as my invention:

1. A process for separating a hydrocarbon feed mixture comprising $C_3$ hydrocarbons, $C_4$ hydrocarbons and alkylate comprising the steps of:
   (a) introducing said feed mixture into an upper section of stripping means maintained under stripping conditions including an overhead temperature of from about 140° F. to about 250° F., a bottoms temperature of from about 225° F. to about 400° F. and a pressure of from about 125 p.s.i.g. to about 350 p.s.i.g. to strip said feed mixture into a gaseous fraction and a liquid fraction;
   (b) vaporizing in a lower section of said stripping means from about 50% to about 90% by volume of said liquid fraction of Step (a);
   (c) removing an overhead first gaseous fraction comprising propane and isobutane;

(d) partially condensing said overhead fraction under conditions sufficient to produce a second vapor fraction comprising propane and a second liquid fraction comprising isobutane; and, (e) removing from said stripping means a bottoms first liquid fraction comprising isobutane, normal butane and alkylate.

2. The process according to claim 1 wherein said overhead second gaseous fraction is passed to fractionation means under conditions sufficient to produce a substantially pure alkylate product stream.

3. The process according to claim 1 wherein said bottoms first liquid fraction is passed into fractionation means under conditions sufficient to produce a substantially pure alkylate product stream;

4. The process according to claim 1 wherein said second vapor fraction comprises from about 5 to about 50% by volume of said overhead fraction.

References Cited

UNITED STATES PATENTS

| 2,832,812 | 4/1958 | Belden | 260—683.47 |
| 2,881,229 | 4/1959 | Drehman et al. | 260—683.47 |
| 2,990,437 | 6/1961 | Berger | 260—683.48 |
| 3,204,010 | 8/1965 | Van Pool | 260—683.48 |
| 3,309,420 | 3/1967 | Van Pool | 260—683.48 |
| 2,382,067 | 8/1945 | Kniel | 260—683.59 |
| 2,454,869 | 11/1948 | Goldsby et al. | 260—683.59 |
| 3,018,310 | 1/1962 | Van Pool | 260—683.48 |
| 3,415,899 | 12/1968 | Van Dijk | 260—683.62 |

DELBERT E. GANTZ, Primary Examiner

G. J. CRASANAKIS, Assistant Examiner

U.S. Cl. X.R.

208—351, 354; 260—683.48, 683.62